US010385744B2

United States Patent
Wessels

(10) Patent No.: US 10,385,744 B2
(45) Date of Patent: Aug. 20, 2019

(54) METHOD FOR PRODUCING A GASOLINE ENGINE EXHAUST GAS SYSTEM HAVING A PARTICULATE FILTER, AND EXHAUST GAS SYSTEM OF A GASOLINE ENGINE

(71) Applicant: Dr. Ing. h.c. F. Porsche Aktiengesellschaft, Stuttgart (DE)

(72) Inventor: Michael Wessels, Bietigheim-Bissingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 20 days.

(21) Appl. No.: 15/950,242

(22) Filed: Apr. 11, 2018

(65) Prior Publication Data

US 2018/0298799 A1    Oct. 18, 2018

(30) Foreign Application Priority Data

Apr. 12, 2017    (DE) .................. 10 2017 107 893

(51) Int. Cl.
*F01N 3/021*    (2006.01)
*F01N 13/16*    (2010.01)
(Continued)

(52) U.S. Cl.
CPC .......... *F01N 3/0211* (2013.01); *B01D 46/42* (2013.01); *F01N 3/021* (2013.01); *F01N 3/10* (2013.01);
(Continued)

(58) Field of Classification Search
CPC combination set(s) only.
See application file for complete search history.

(56) References Cited

U.S. PATENT DOCUMENTS 6,776,815 B2 *  8/2004  Kato .................. F01N 3/0222
                                                55/282.3
7,410,521 B2 *  8/2008  Sellers ................ F01N 3/023
                                                55/283
(Continued)

FOREIGN PATENT DOCUMENTS

DE    10 2016 110 166    12/2016
WO       2014/183998    11/2014

OTHER PUBLICATIONS

German Search Report dated Jan. 25, 2018.

*Primary Examiner* — Binh Q Tran
(74) *Attorney, Agent, or Firm* — Gerald E. Hespos; Michael J. Porco; Matthew T. Hespos

(57) ABSTRACT

A method for producing a gasoline engine exhaust gas system having a particulate filter includes using at least one spacer for positioning at least two components provided for the passage of exhaust gas from the engine. The spacer includes ash-forming constituents. The method then includes permanently connecting the components, and burning the spacer element during a first heating up of the exhaust gas system, thereby releasing the ash-forming constituents and depositing the ash-forming constituents on the particulate filter. An exhaust gas system of a gasoline engine also is provided in a state before a first heating up of the exhaust gas system. The exhaust gas system includes a burnable spacer element between two exhaust gas system components that are provided for the passage of exhaust gas. The burnable spacer elements include ash-forming constituents.

12 Claims, 1 Drawing Sheet

(51) Int. Cl.
*F01N 3/28* (2006.01)
*F01N 13/00* (2010.01)
*B01D 46/42* (2006.01)
*F01N 3/10* (2006.01)

(52) U.S. Cl.
CPC ......... *F01N 3/2878* (2013.01); *F01N 13/009* (2014.06); *F01N 13/0097* (2014.06); *F01N 13/16* (2013.01); *B01D 2279/30* (2013.01); *F01N 2350/00* (2013.01); *F01N 2450/02* (2013.01); *Y02T 10/20* (2013.01)

(56) References Cited

U.S. PATENT DOCUMENTS

| | | | |
|---|---|---|---|
| 7,572,416 B2* | 8/2009 | Alward | B01D 39/2082 422/180 |
| 9,687,819 B2* | 6/2017 | Yin | B01J 21/04 |
| 2010/0307339 A1* | 12/2010 | Tadrous | B01D 46/0063 95/280 |
| 2016/0363019 A1 | 12/2016 | Warner et al. | |
| 2017/0362977 A1* | 12/2017 | Zhang | B01D 46/0063 |

* cited by examiner

METHOD FOR PRODUCING A GASOLINE ENGINE EXHAUST GAS SYSTEM HAVING A PARTICULATE FILTER, AND EXHAUST GAS SYSTEM OF A GASOLINE ENGINE

CROSS REFERENCE TO RELATED APPLICATION

This application claims priority under 35 USC 119 to German Patent Appl. No. 10 2017 107 893.2 filed on Apr. 12, 2017, the entire disclosure of which is incorporated herein by reference.

BACKGROUND

Field of the Invention

The invention relates to a method for producing a gasoline engine exhaust gas system having a particulate filter. The invention further relates to an exhaust gas system of a gasoline engine in the state before the first heating up of the exhaust gas system.

Description of the Related Art

Current legal requirements for reducing fuel consumption and simultaneously tightening the particulate limit values (mass and number) increasingly present a challenge for the development of internal combustion engines. The compliance with future particulate limit values in accordance with the required boundary conditions will impede future efforts of reducing consumption. This will lead to virtually all internal combustion engines in future having a particulate filter, as already is the case in diesel engines.

Soot from combustion is deposited in the particulate filter and converted again into gaseous constituents by a specific regeneration of the filter. Furthermore, ash constituents that originate in engine oil additives and/or fuel additives remain permanently in the filter. The soot loading of the filter currently is detected by a counterpressure measurement and redundantly via a calculation model. Active measures for soot regeneration are initiated depending on the soot level. However, the counterpressure measurement ($\Delta p = f$ (soot loading)) has a pronounced hysteresis, and therefore a clear association between the loading of the particulate filter with soot and the counterpressure is not provided. Regeneration based on a calculation model generally is too early because of the strong fuel influence, in particular because the number/mass of particulates may vary by a factor of 5 between fuels. A reduction of the hysteresis of the counterpressure is desired to obtain a clear control variable for the regeneration of the particulate filter. At the same time, in a situation without hysteresis behavior, a more stable protection of the components can also be ensured since specifically highly loaded edge zones can be detected better by counterpressure measurement.

Current particulate filters have two filter functions, namely, depth filtration and surface filtration. Soot deposition thus leads in the first step to depth filtration with a high pressure rise and in the second step to surface filtrations with a smaller pressure rise.

Depth filtration deposits particulates in the wall of the particulate filter. Surface filtration takes place on the surface of the filter. Over an operating period, the particulate filter becomes ever more from the depth filter to the surface filter. Depth filtration is associated with a high pressure rise, since the permeability of the exhaust gas is influenced negatively. If the pores in the wall are substantially coated with soot, the soot subsequently primarily accumulates on the wall. This surface filtration leads to a moderate pressure rise, smaller than in depth filtration. If the soot in the filter then is regenerated, the pressure is dissipated with a hysteresis behavior characterized by a large pressure drop in a first step, and subsequently with a moderate pressure drop.

In contrast to soot, the ash in the particulate filter always accumulates on the wall and not in the wall. Soot cannot penetrate the ash layer, and thus the ash fundamentally and irreversibly prevents the depth filtration of the soot. The pressure rise with increasing soot deposition produces a linear relationship without hysteresis over the entire region. Thus, the quality of determining the soot loading by a counterpressure measurement is increased significantly so that soot regeneration strategies can be controlled in a more target-oriented and consumption-optimal manner.

To solve the above-described problem, an ash layer would have to be applied in the form of a filter cake to the surface of the duct walls of the particulate filter in the new state; consequently, it would have to be applied before the first heating up of the exhaust gas system.

WO 2014/183998 A1 discloses a method for determining soot loadings of a particulate filter in gasoline engines. The determination of the admitted soot loading comprises taking into consideration predetermined soot portions of soot-relevant events of a standardized driving cycle.

It is known, during the production of exhaust gas systems, to install plastics rings as spacers in the exhaust gas system. These rings function during the manufacturing process to ensure that the components are positioned correctly with respect to one another and maintain the required distance from one another. The spacer rings are no longer required after the parts are welded together. The plastic rings are burned during the first heating up of the exhaust gas system by the engine, and the components in the interior of the exhaust gas system have the necessary free movement that they require during operation.

It is an object of the invention to provide a method for producing a gasoline engine exhaust gas system having a particulate filter where the method applies an ash layer to the particulate filter in an extremely simple manner. In particular, an object of the invention is to provide a method for applying an ash layer as a filter cake to the surface of the duct walls of the particulate filter. A further object of the invention is to provide an exhaust gas system of a gasoline engine with a structurally extremely simple design that permits a targeted application of an ash layer.

SUMMARY

The invention relates to a method for producing a gasoline engine exhaust gas system having a particulate filter. The method includes positioning at least two components provided for the passage of exhaust gas. At least one of the components in the exhaust gas system is provided between an outlet valve of the gasoline engine and the particulate filter. The method may further include arranging a spacer element between the components so that the spacer element positions the components. The spacer element includes ash-forming constituents. The method then includes permanently connecting the components that have been positioned by the spacer element arranged between the components. The method then includes burning the spacer element during the first heating up of the exhaust gas system with release of the ash-forming constituents and deposition thereof on the particulate filter.

The spacer element therefore has the function of ensuring that the components are positioned correctly with respect to one another during the manufacturing process and also maintains the required distance from one another. The spacer element includes ash-forming constituents, and therefore the spacer element burns during the first heating up of the exhaust gas system with release of the ash-forming constituents and deposition thereof on the particulate filter. Any material that can burn under the boundary conditions present in an exhaust gas system is suitable for the spacer element. The sole condition is that the material has to include ash-forming constituents. Those constituents then are released during the heating up of the exhaust gas system and are carried by the exhaust gas flow onto the particulate filter of the gasoline engine. It merely is necessary for the position of the spacer element to be selected to be upstream of the particulate filter. The respective spacer element can basically be arranged between the outlet valve and the particulate filter.

The application of the ash constituents as described above eliminates an additional process step. Spacer elements were used previously during assembly, but the spacer elements of the subject method include ash-forming constituents. The spacer elements burn during the first heating up of the exhaust gas system. As a result, the ash-forming constituents are released and are deposited on the particulate filter. The spacer element is placed directly upstream of the particulate filter. Thus, the released ash-forming constituents can act only on the particulate filter and do not affect other engine components. The particulate filter reaches its full filtration rate after the first heating through of the exhaust gas system. Therefore, the additional effect that results from spacer elements having ash-forming constituents can be realized without additional relevant costs in relation to the previous spacer elements made of plastic.

One of the components may be the particulate filter and another of the components may be arranged directly upstream of the particulate filter in terms of flow of exhaust gas. This achieves the advantage mentioned that the ash-forming constituents act only on the particulate filter.

The components may be arranged upstream of the particulate filter in terms of flow of exhaust gas. The spacer element in this case is not placed between the particulate filter and the component arranged directly upstream of the particulate filter in terms of flow of exhaust gas, but rather between components arranged upstream of the particulate filter in terms of flow of exhaust gas.

The at least one spacer element may be arranged directly upstream of the particulate filter.

The components may be connected permanently to one another by welding. After the permanent connection of the components, the spacer element or the spacer elements only has or have their function as an element that includes the ash-forming constituents. The ash-forming constituents are released during the burning of the spacer element during the first heating up of the exhaust gas system and are deposited on the particulate filter.

The spacer element may be composed of plastic or paper provided with the ash-forming constituent may be arranged between the components. These materials are particularly well suited to absorbing the ash-forming constituents.

The ash-forming constituents or the ash layer applied to the particulate filter may consist of elements that cannot be removed again by oxidation or general detachment during subsequent operation. Furthermore, it should be ensured that the ash layer is introduced only onto the wall and not into the wall. Such elements are, for example, Ca, Mg, P and Zn.

The spacer element may be a ring arranged between the components. Plural rings can be arranged between plural consecutively arranged components.

The method according to the invention along with the developments thereof contains diverse advantages:

It is thus possible to apply the ash precisely to the surface of the particulate filter.

The ash layer can be set precisely with regard to thickness and composition when the respective spacer element is provided appropriately with ash-forming constituents.

The depth filtration is suppressed in a specific manner and therefore a clear association between counterpressure and accumulated soot can be produced.

The counterpressure of the parts remains relatively constant over the running time thereof and the pressure rise behaves linearly.

The filtration rate of current particulate filters takes on the desired value only after a certain running time. With this method, the filtration rate can be set very precisely and reaches the required value already directly following the first heating up of the exhaust gas system.

The particulate filter can be of extremely porous design and can therefore have an extremely low counterpressure because the filtration rate can be set precisely with the method of the invention.

The object of the invention also is achieved by an exhaust gas system of a gasoline engine that has, in a state before a first heating up of the exhaust gas system, at least two exhaust gas system components that are provided for the passage of exhaust gas and are permanently connected to one another. The components are arranged between an outlet valve of the gasoline engine and a particulate filter. One of the components may be the particulate filter and the other component may be arranged upstream of the particulate filter in terms of flow of exhaust gas. At least one burnable spacer element is arranged between the components. The spacer element positions the components and includes ash-forming constituents.

The at least one spacer element may be a ring arranged between the two components.

The at least one spacer element may be composed of plastic with ash-forming constituents, or paper with ash-forming constituents.

The spacer element may be between the particulate filter and a catalytic converter of the exhaust gas system.

DETAILED DESCRIPTION

Figure 1:
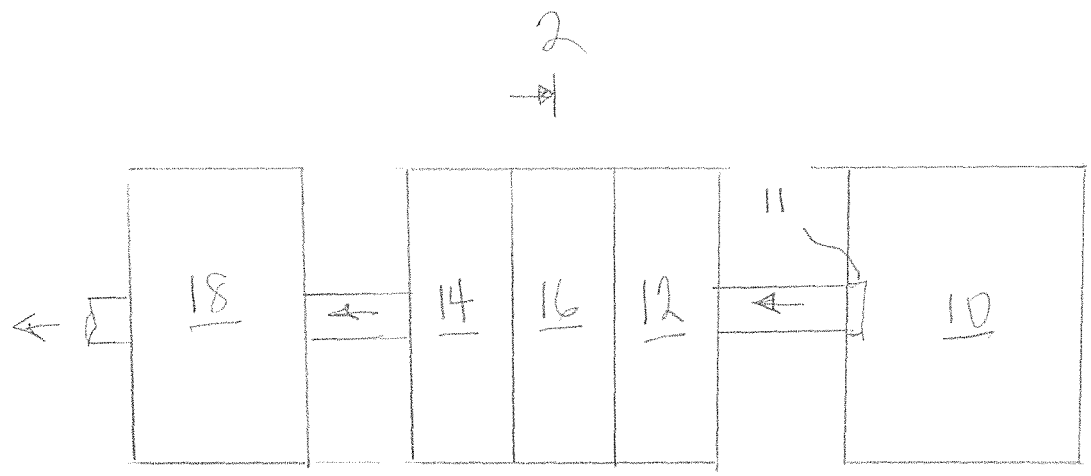
FIG. 1 is a schematic illustration of an exhaust gas system in accordance with a first embodiment of the invention.
Figure 2:
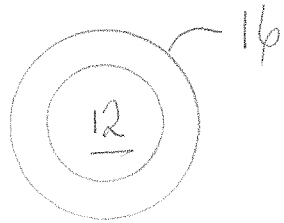
FIG. 2 is a cross-sectional view taken along line 2-2 of FIG. 1.

An exhaust gas system in accordance with a first embodiment of the invention is illustrated schematically in FIG. 1. The exhaust gas system is used with a gasoline engine 10 and specifically extends from an outlet valve 11 of the engine 10. The exhaust gas system of FIG. 1 includes first and second components 12 and 14 and a burnable spacer element 16 arranged between the first and second components for positioning the first and second components relative to one another and relative to other parts of the exhaust gas system. The spacer element 16 includes ash-forming constituents. Additionally, the spacer element 16 may define a generally ring-shaped as illustrated, for example, in FIG. 2. The exhaust gas system of FIG. 1 further includes a particulate filter 18 downstream of the second component 14. With the arrangement illustrated in FIG. 1, the spacer element will be burned, thereby releasing the ash-forming constituents and depositing the ash-forming constituents on the particulate filter 18.

Figure 3:
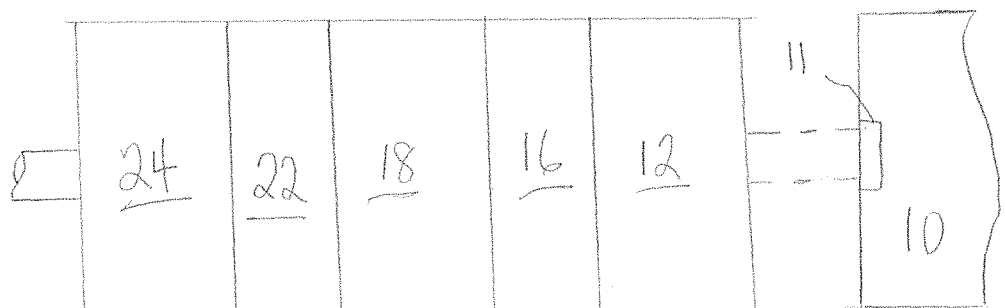
FIG. 3 is a schematic illustration of an exhaust gas system in accordance with a second embodiment.

FIG. 3 is a schematic illustration of an alternate embodiment of an exhaust gas system. The embodiment of FIG. 3 differs from the embodiment of FIG. 1 primarily in that the spacer element 16 directly abuts against the particulate filter 18. Thus, the particulate filter 18 is the second component in the embodiment of FIG. 3. Additionally, the embodiment of FIG. 3 has a catalytic converter 24 disposed downstream of the particulate filter 18. A second burnable spacer element 22 is positioned between the particulate filter 18 and the catalytic converter 24. The second spacer element 22 also includes ash-forming constituents. In both embodiments, the burnable spacer element 16, 22 may be formed from paper and/or plastic, with the ash-forming constituents being arranged between or on the paper or plastic.

What is claimed is:

1. A method for producing a gasoline engine exhaust gas system having a particulate filter, with the following features:
    using at least one spacer element for positioning at least first and second components provided for the passage of exhaust gas, at least the first component being in the exhaust gas system between an outlet valve of the gasoline engine and the particulate filter, the second component being downstream of the first component, the at least one spacer element being arranged between the first and second components and including ash-forming constituents;
    permanently connecting the components in the exhaust gas system; and
    performing a first heating up of the exhaust gas system and thereby: burning the at least one spacer element, releasing the ash-forming constituents and depositing the ash-forming constituents on the particulate filter.

2. The method of claim 1, wherein the second component is the particulate filter and the first component is arranged directly upstream of the particulate filter in terms of flow of exhaust gas.

3. The method of claim 1, wherein the first and second components are arranged upstream of the particulate filter in terms of flow of exhaust gas.

4. The method of claim 1, wherein the at least one spacer element is arranged directly upstream of the particulate filter.

5. The method of claim 1, wherein the components are permanently connected to one another by welding.

6. The method of claim 1, wherein the at least one spacer element comprises plastic or paper provided with the ash-forming constituents.

7. The method of claim 1, wherein the at least one spacer element is at least one ring arranged between the components.

8. The method of claim 7, wherein the at least one ring comprises a plurality of rings are arranged between a plurality of components arranged consecutively.

9. An exhaust gas system of a gasoline engine in a state before a first heating up of the exhaust gas system, comprising:
    at least first and second exhaust gas system components defining parts of a passage for exhaust gas from the engine, the components being connected permanently in the passage, the first component being arranged between an outlet valve of the gasoline engine and a particulate filter, the second component being downstream of the first component; and
    at least one burnable spacer element arranged between the first and second components and positioning the first and second components, the at least one spacer element including ash-forming constituents.

10. The exhaust gas system of claim 9, wherein the at least one spacer element is composed of plastic with ash-forming constituents or paper with ash-forming constituents.

11. The exhaust gas system of claim 9, wherein the at least one spacer element is a ring arranged between the first and second components.

12. The exhaust gas system of claim 9, wherein the at least one spacer element is arranged between the particulate filter and a catalytic converter.

* * * * *